United States Patent [19]
Jejelowo et al.

[11] Patent Number: 5,801,113
[45] Date of Patent: Sep. 1, 1998

[54] POLYMERIZATION CATALYST SYSTEMS, THEIR PRODUCTION AND USE

[75] Inventors: Moses Olukayode Jejelowo, Kingwood; Gregory George Hlatky, Houston, both of Tex.

[73] Assignee: Exxon Chemical Patents, Inc., Houston, Tex.

[21] Appl. No.: 483,650

[22] Filed: Jun. 7, 1995

Related U.S. Application Data

[63] Continuation of Ser. No. 155,313, Nov. 19, 1993, abandoned, which is a continuation-in-part of Ser. No. 542,236, Jun. 22, 1990, and a continuation-in-part of Ser. No. 926,006, Aug. 5, 1992, abandoned.

[51] Int. Cl.$^6$ .................................................. C08F 4/64
[52] U.S. Cl. ......................... 502/104; 502/117; 502/152; 502/155; 526/129; 526/160; 526/943; 526/348.6
[58] Field of Search ........................... 502/104, 117, 502/152, 155; 526/160

[56] References Cited

U.S. PATENT DOCUMENTS

| | | | |
|---|---|---|---|
| 4,752,597 | 6/1988 | Turner | 502/104 |
| 4,791,180 | 12/1988 | Turner | 526/160 |
| 4,808,561 | 2/1989 | Welborn, Jr. | 502/104 |
| 4,897,455 | 1/1990 | Welborn, Jr. | 526/129 |
| 5,017,714 | 5/1991 | Welborn, Jr. | 556/12 |
| 5,057,475 | 10/1991 | Canich et al. | 502/104 |
| 5,064,802 | 11/1991 | Stevens et al. | 502/155 |
| 5,120,867 | 6/1992 | Welborn, Jr. | 556/12 |
| 5,153,157 | 10/1992 | Hlatky et al. | 502/117 |
| 5,198,401 | 3/1993 | Turner et al. | 502/155 |
| 5,227,440 | 7/1993 | Canich et al. | 526/129 |
| 5,241,025 | 8/1993 | Hlatky et al. | 526/129 |
| 5,314,973 | 5/1994 | Welborn, Jr. | 526/126 |
| 5,321,106 | 6/1994 | LaPointe | 526/126 |
| 5,441,920 | 8/1995 | Welborn, Jr. | 502/103 |

FOREIGN PATENT DOCUMENTS

| | | |
|---|---|---|
| 0 560 128 A2 | 5/1979 | European Pat. Off. ......... C08F 10/00 |
| 0406912A2 | 1/1991 | European Pat. Off. . |
| 04180044A2 | 3/1991 | European Pat. Off. . |
| 0495375A2 | 7/1992 | European Pat. Off. . |
| 0522581A1 | 1/1993 | European Pat. Off. . |
| 91/02012 | 2/1991 | WIPO . |
| WO 91/09882 | 7/1991 | WIPO . |
| WO 92/00333 | 1/1992 | WIPO . |
| WO 93/14132 | 7/1993 | WIPO . |
| WO 93/19103 | 9/1993 | WIPO ............ C08F 10/00 |
| WO 93/19104 | 9/1993 | WIPO . |
| WO 94/03506 | 2/1994 | WIPO ............ C08F 10/00 |
| WO 94/07928 | 4/1994 | WIPO . |

OTHER PUBLICATIONS

P.J. Shapiro, J. Bercaw, et al., Organometallics 9, 867–869 (1990).
J. Bercaw et al., Southwest Regional ACS Meeting, Corpus Christi, Texas, Nov. 30, 1988 (Abstract #47).
Zerlong Lin et al., J. Am. Chem. Soc., 1987, 109, 4127–4129.
G. Hlatky et al., J. Am. Chem. Soc., 1989, 111, 2728–2729.
G. Schmidt et al., J. Am. Chem. Soc., 1985, 107, 1443–1444.
R. Cracknell et al., J. Chem. Soc., Chem. Commun., 1984, 326–328.
M. Brookhart et al., J. Organometallics Chem., 250 (1983) 395–408.
M. Brookhart et al., J. Chem. Soc., Chem. Commun., 1983, 691–693.
M. Reetz, Organotitanium Reagents in Organic Synthesis, pp. 117 and 121 (Springer–Verlay) 1986.
Kukenhohner, "Untersuchungen zur Darstellung Chiraler Organoititan (IV)—Verbindungen fur Enantioselektire Synthesen" (1983) (unpublished Diplomarbeit, Univ. of Marburg, Germany).
Kukenhohner, Organotian (IV) Agentien: Komplexe Chiraler Chelatliganden und Enantioselektire c–c– Verknupfungen (1986) (Univ. of Marburg, Germany).

*Primary Examiner*—David W. Wu
*Attorney, Agent, or Firm*—Jaimes Sher; William G. Muller

[57] ABSTRACT

The invention is generally directed toward a catalyst system useful for polymerizing olefins. The catalyst system of this invention comprises a supported ion-exchange catalyst system.

17 Claims, No Drawings

POLYMERIZATION CATALYST SYSTEMS, THEIR PRODUCTION AND USE

CROSS-REFERENCE TO RELATED PATENT APPLICATION

This is a continuation of application Ser. No. 08/155,313, filed Nov. 19, 1993, now abandoned which is a continuation-in-part of U.S. application Ser. No. 07/542,236, filed Jun. 22, 1990 and also of U.S. application Ser. No. 07/926,006, filed Aug. 5, 1992, now abandoned.

FIELD OF THE INVENTION

This invention relates to catalysts, catalyst systems and to methods for their production and use in olefin polymerization. Particularly, the invention is directed toward a supported ion-exchange catalyst especially useful in the gas phase polymerization of olefins.

BACKGROUND OF THE INVENTION

A new catalyst technology has developed which provides for the modification and/or control over the properties and characteristics of a polymer. This technology principally involves the general field of transition metal catalysis.

These new catalysts can be referred to as bulky ligand transition metal catalysts. The bulky ligand contains a multiplicity of bonded atoms, preferably carbon atoms, forming a group which can be cyclic. The bulky ligand may be a cyclopentadienyl ligand or cyclopentadiene-derived ligand which can be mono- or poly-nuclear. One or more bulky ligands may be π-bonded to the transition metal atom. The transition metal atom may be a Group 4, 5 or 6 transition metal. Other ligands may be bonded to the transition metal, such as a hydrocarbyl or halogen leaving group at least one of which is detachable by a cocatalyst. The catalyst is derivable from a compound of the formula:

wherein L is the bulky ligand a, X is the leaving group, M is the transition metal and m and n are such that the total ligand valency corresponds to the transition metal valency. Preferably the catalyst is four co-ordinate such that the compound is ionizable by the cocatalyst to a 1+ valency state.

The ligands L and X may be bridged to each other and if two ligands L and/or X are present, they may be bridged. The metallocenes may be full-sandwich compounds having two ligands L which may be cyclopentadiene ligand or cyclopentadiene-derived ligand π-bonded to the metal atom or half-sandwich compounds having one ligand L which is a cyclopentadienyl ligand or derived ligand.

Generally, these bulky catalysts are referred to as metallocene catalysts. Polymerization of olefins with metallocene catalysts requires their activation, such as by an alumoxane cocatalyst. Metallocene-alumoxane catalysts have been described in EP-A-0 129 368, published Jul. 26, 1989, U.S. Pat. Nos. 4,897,455, 4,937,299, 5,017,714, 5,057,475, 5,086,025 and 5,120,867. For instance, U.S. Pat. No. 5,057,475 and related U.S. Pat. No. 5,227,440 describe a supported catalyst system that includes an inert support material, a Group IVB transition metal component and an alumoxane component.

EP-A-0 277 003 and EP-A- 0 277 004, published Aug. 3, 1987, PCT International Publication WO 91/09882, published Jul. 11, 1991 and WO 92/0333 describe a Group 4 transition metal metallocene catalyst system that does not require alumoxane as an activator. The activator for the metallocene component described in these references is referred to as an ionic activator or a non-coordinating anion which comprises at least one moiety capable of abstracting a ligand from the bulky ligand compound to produce a resulting cationic bulky ligand compound and an anionic activator compound. The ionic activator, which comprises a cation, irreversibly reacts with a ligand of a bulky ligand transition metal compound to produce a bulky ligand transition metal cation which combines with the anion of the activator to form an ionic pair. This ionic pair is the active catalyst.

U.S. Pat. No. 5,153,157 describes a catalyst system of a reaction product of a bis(cyclopentadienyl) Group IVB metal compound, an ionic activator and an organometallic additive compound.

U.S. Pat. No. 5,198,401 relates to a composition of matter of a Group IVB bis(cyclopentadienyl) metal cation non-coordinating anion.

PCT International Publication WO 91/09882 discloses a supported polymerization ionic catalyst where the metallocene is a bis(cyclopentadienyl) metal compound.

U.S. Pat. No. 5,064,802 is directed towards a monocyclopentadienyl or substituted monocyclopentadienyl metal complex and a non-coordinating anion. A general statement is made that such catalysts can be supported on silica or alumina.

PCT International Publication WO 93/14132, published Jul. 22, 1993 discloses a cationic complex of a Group 4 metal cyclopentadienyl derivative and an alumoxane.

PCT International Publication WO 93/19104, published Sep. 30, 1993 discloses a Group 4 meal in a +3 oxidation state with an activating cocatalyst which can be alumoxanes and Lewis acids or mixtures thereof Copending U.S. application Ser. No. 07/957,305 now abandoned discloses a Group 4 transition metal catalyst activated by an ion exchange reagent and an organometallic compound. These references disclose that these catalysts can be supported.

It is desirable in many polymerization processes, particularly a gas phase process, to use a supported catalyst. Generally these catalyst systems include a metallocene and alumoxane supported on the same carrier, such as silica, and subsequently dried to a powder. For example, U.S. Pat. No. 4,937,217 generally describes a mixture of trimethylaluminum and triethylaluminum added to an undehydrated silica followed by the addition of a metallocene to form a dry catalyst. EP-308177-B1 generally describes adding a wet monomer to a reactor containing a metallocene, trialkylaluminum and undehydrated silica. U.S. Pat. Nos. 4,912,075, 4,935,937 and 4,937,301 generally relate to adding trimethylaluminum to an undehydrated silica and then adding a metallocene to form a dry supported catalyst. Similarly, U.S. Pat. Nos. 5,008,228, 5,086,025 and 5,147,949 generally describe forming a dry supported catalyst by the addition of trimethylaluminum to a water impregnated silica followed by the addition of the metallocene. U.S. Pat. No. 4,914,253 describes adding trimethylaluminum to undehydrated silica, adding a metallocene and then drying the catalyst with an amount of hydrogen to produce a polyethylene wax. U.S. Pat. Nos. 4,808,561, 4,897,455 and 4,701,432 describe techniques to form a supported catalyst where the inert carrier, typically silica, is calcined and contacted with a metallocene(s) and a activator/cocatalyst component. U.S. Pat. No. 5,238,892 describes forming a dry supported catalyst by mixing a metallocene with an alkyl aluminum then adding undehydrated silica. U.S. Pat. No. 5,240,894 generally pertains to forming a supported metallocene/alumoxane catalyst system by forming a metallocene/alumoxane reaction solution, adding a porous carrier, evaporating the resulting slurry to remove residual solvent from the carrier. EP-A-522 581, published Jan. 13, 1993 discloses an olefin polymerization catalyst of a Group IVB transition metal compound and a compound capable of forming an ionic complex with the transition metal compound on a carrier and an organoaluminum compound. These references all concern the combination of a metallocene and alumoxane on one support or hydrolyzing an aluminum alkyl in situ on one support with a metallocene catalyst compound.

It would be desirable to have a polymerization catalyst system that could be easily modified without having to reformulate the entire catalyst system. Thus, a need exists in the industry for an improved catalyst system and method for producing such a catalyst system.

SUMMARY OF THE INVENTION

The present invention is directed towards a new polymerization catalyst system and to methods of its manufacture. The invention is also directed to a gas phase polymerization process for polymerizing alpha-olefin monomers in the presence of the supported ionic catalyst system of the invention.

More particularly, the present invention is directed to a gas phase process for polymerizing olefins, alone or in combination with one or more other alpha- olefins, wherein the process comprises contacting an olefin, alone or in combination with one or more other olefins, with a supported ionic catalyst, the catalyst comprising a monocyclopentadienyl ligand transition metal containing compound, an ionic activator and a supported organometallic compound. In an embodiment the transition metal compound and the activator are separately supported.

DETAILED DESCRIPTION OF THE INVENTION

Introduction

This invention is generally directed toward a supported catalyst system useful for polymerizing olefins. The method for forming the catalyst system of the invention provides for combining a monocyclopentadienyl bulky ligand transition metal catalyst system with a separately supported organometallic compound. A preferred method provides for supporting the catalyst system on a carrier and contacting such supported system with a separately supported organometallic compound. The bulky ligand transition metal compound used in the catalyst system of the invention can be a metallocene. The ionic metallocene catalyst systems of the invention have unexpectedly high activity as compared to the catalyst systems previously described.

In one embodiment of the present invention the supported catalyst is a monocyclopentadienyl transition metal metallocene compound and an ionic activator.

Thus, the supported catalyst system of the present invention is broadly defined as a catalyst system which comprises a carrier, a monocyclopentadienyl bridged heteroatom transition metal containing compound, an ionic activator and a supported organometallic compound.

PROCESS OF THE INVENTION

The catalyst system of this invention is particularly well suited for the polymerization of monomers and optionally comonomers in any polymerization or prepolymerization process, gas, slurry or solution phase; a high pressure autoclave process can be also utilized. In the preferred embodiment a gas phase process is utilized.

The preferred embodiment of the process of this invention is directed toward a gas phase polymerization or copolymerization reaction involving the polymerization or optionally prepolymerization of one or more olefins, monoolefins, diolefins, cyclic olefins and acetylenically unsaturated monomers. Preferably, the monomers are ethylene and alpha-olefins having from 3 to 20 carbon atoms, most preferably 3–12 carbon atoms. The invention is particularly suitable for copolymerization reactions involving polymerization of one or more of the monomers, for example alpha-olefin monomers of ethylene, propylene, butene-1, pentene-1, 4-methylpentene-1, hexene-1, octene-1, decene-1, cyclic olefins such as norbornene and alpha-olefins substituted with aryl groups such as styrene. Other monomers can include vinyl, diene, norbornene, acetylene and aldehyde monomers. Preferably, a homopolymer of ethylene or a copolymer of ethylene and a $C_3$ to $C_{10}$ alpha-olefin is produced such that the amount of ethylene or $C_3$ to $C_{10}$ alpha-olefin and comonomer is adjusted to produce a desired polymer product. Preferably the comonomer is an alpha-olefin having from 3 to 15 carbon atoms, preferably 4 to 12 carbon atoms and most preferably 4 to 10 carbon atoms. In another embodiment ethylene is polymerized with at least two comonomers to form a terpolymer and the like. Most preferred comonomers for polymerization with ethylene are butene-1, hexene-1, 4-methy- 1-pentene and octene-1.

In another embodiment of the process of the invention, the olefin(s) are prepolymerized in the presence of the catalyst system of the invention to form a prepolymerized catalyst prior to the main polymerization. The prepolymerization can be carried out batchwise or continuously in gas, solution or slurry phase including at elevated pressures. The prepolymerization can take place with any of the above described monomers, and/or in the presence of any molecular weight controlling agent such as hydrogen. For details on prepolymerization see, for example U.S. Pat. No. 4,923,833 and 4,921,825 and EP-B-0279 863, published Oct. 14, 1992 all of which are incorporated fully herein by reference.

In a gas phase polymerization process a continuous cycle is typically employed wherein one part of the cycle of a reactor, a cycling gas stream (otherwise known as a recycle stream or fluidizing medium) is heated in the reactor by the heat of polymerization. This heat is removed in another part of the cycle by a cooling system external to the reactor.

Generally, in a gas fluidized bed process for producing polymer from monomers, a gaseous stream containing one or more monomers is continuously cycled through a fluidized bed in the presence of a catalyst under reactive conditions. The gaseous stream is withdrawn from the fluidized bed and recycled back into the reactor. Simultaneously, polymer product is withdrawn from the reactor and new or fresh monomer is added to replace the polymerized monomer.

The catalyst is introduced into the reactor via a catalyst feeder mechanism either continuously or intermittently as is known in the art. Usually the catalyst is contained in a vessel with a mechanism for controlling the quantity of catalyst to be injected into the reactor. Typically the catalyst is blown into the reactor with a gas such as nitrogen. Many times these systems have multiple catalyst feeders and injection points for introducing catalyst into a reactor. The invention provides for a process for polymerizing olefins alone or in combination with one or more other olefins in a gas phase reactor, said process comprising polymerization in the presence of a catalyst system which is introduced into the reactor, the catalyst comprising (a) a monocyclopentadienyl transition metal compound, an ionic activator and (b) a supported organometallic compound. In another embodiment the catalyst system of the invention is at least a two component system where a first component (a) comprises a carrier, a monocyclopentadienyl transition metal compound and an ionic activator and a second component (b) comprising a carrier and an organometallic compound.

In one embodiment of the invention components (a) and (b) are introduced into the reactor simultaneously from the same or different catalyst feeder. In another embodiment components (a) and (b) are introduced into the reactor together or apart. In still yet another embodiment components (a) and (b) are introduced into the reactor mixed together.

It is also contemplated in an alternative embodiment that the first component could comprise a mixture of a bulky ligand transition metal compound and a traditional Ziegler-Natta catalyst compound, other non-bulky ligand transition metal compound, or non-metallocene compound. Thus, the same is true for the activator component of the invention which could include any activator for the traditional Ziegler-Natta catalyst or non-metallocene compound alone or in combination with those activators and catalysts previously described.

For the preferred monomer, ethylene, depending on the catalyst, the (comonomer to ethylene) $C_x/C_2$ ratios are preferably less than about 0.2, and more preferably less than about 0.1, and as low as about 0.02 to provide a polymer having a density in the range of from about 0.86 g/cm$^3$ to about 0.96 g/cm$^3$, preferably about 0.88 g/cm$^3$ to about 0.94 g/cm$^3$ and most preferably between about 0.90 g/cm$^3$ to about 0.935 g/cm$^3$.

The reactivity ratios of the catalysts and catalyst systems of this invention are in the range of less than 2 to about 0.1, generally less than about 2, preferably less than about 1.5 and more preferably less than about 1 and most preferably less than about 0.5. Reactivity ratio is defined to be the mole ratio of comonomer to monomer in the recycle stream ($C_x/C_y$) divided by the mole ratio of comonomer to monomer ($C_x/C_y$) in the polymer produced, where $C_x$ is the mole percent of comonomer and $C_y$ is the mole percent of the monomer.

The supported ionic transition metal catalysts suitable for use in the process of this invention preferably comprise an ionic transition metal catalyst and an organometallic compound on a suitable support material or carrier. The transition metal component of the ionic catalysts may be selected from a cyclopentadienyl (Cp) derivative of a Group 4, 5 and 6, preferably Group 4 transition metal or mixtures thereof (new IUPAC nomenclature based on Periodic Table of Elements as described in *Chemical and Engineering News*, 63(5) 27, 1985) such metal compound containing at least one ligand which will combine with an ionic activator component or at least a portion thereof such as a cation portion thereof.

The ionic activator component, which comprises a cation, irreversibly reacts with at least one ligand of the bulky ligand transition metal component to produce a bulky ligand transition metal cation which combines with the anion of the activator to form an ionic pair which is a chemically stable, non-nucleophilic anionic complex. These can be single coordination complexes comprising a plurality of lipophilic radicals covalently coordinated to and shielding a central formal charge-bearing metal or metalloid atom or an anion which comprises a plurality of boron atoms such as polyhedral boranes, carboranes, and metallacarboranes. The anions are bulky, typically 4 angstroms or greater, labile and stable to any reaction involving the cation of the activator component. The anion may be any suitably substituted anion which is not hydrolyzed by aqueous solutions.

Upon combination of the transition metal component and the activator, there is generated an ion pair comprising a metal cation with a formal coordination number and metal cation, which formed from the transition metal component. Where the transition metal is a Group 4 metal cation, the formal coordination number is 3 or 4 and a valence of +4. Optionally a Group 4 transition metal complex in a +3 oxidation state may be activated with an ionic activator to form an active catalyst. The anion of the ionic activator compound is in the preferred embodiment capable of stabilizing the metal cation complex without interfering with the ability of the metal cation or its decomposition product to function as a catalyst.

European Patent Applications EP 277,003, 277,004, PCT International Application WO 92/00333 and U.S. Pat. Nos. 5,064,802, 5,153,157, 5,198,401 describe the homogeneous variants of ionic catalysts all of which are herein incorporated by reference.

The Transition Metal Component of the Invention

The transition metal compounds, useful as first compounds in the preparation of the improved catalyst of this invention are preferably $\eta^5$-monocyclopentadienyl transition metal compounds of Group 4, 5 or 6, preferably Group 4 transition metals or mixtures thereof. The class of transition metal components suitable for use in the process of the present invention are bulky ligand transition metal component comprising a transition metal, a mono-cyclopentadienyl radical, optionally a bridging group, a heteroatom and at least one leaving group. A preferred subclass of transition metal components or metallocene of the invention comprise a transition metal π-bonded to a mono-cyclopentadienyl ligand; the mono-cyclopentadienyl ligand is optionally but preferably bridged by way of a bridging group to a heteroatom; the heteroatom is bonded to the transition metal; and at least one leaving group is bonded to the transition metal.

The most preferred subclass of useful transition metal component are represented by the following general formulae:

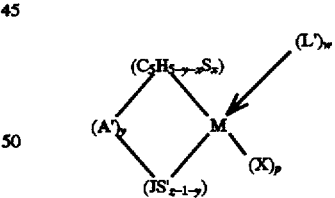

wherein:
A' is a bridging group containing a Group 14 element;
$(C_5H_{5-y-x}S_x)$ or $(C_5H_{5-x}X_x)$ is a Cp ring substituted with from zero to five S radicals, each substituent group S being, independently, a radical group which is a hydrocarbyl, substituted-hydrocarbyl, halocarbyl, substituted-halocarbyl, hydrocarbyl-substituted organometalloid, halocarbyl-substituted organometalloid, hydrocarbyl-substituted boron, hydrocarbyl-substituted pnictogen, hydrocarbyl-substituted chalcogen or halogen or two adjacent S groups are joined forming a $C_4$ to $C_{20}$ ring to give a saturated or unsaturated polycyclic Cp ligand;
x is from 0 to 5 denoting the degree of substitution;
M is a Group 4 transition metal;

wherein:

L' is a neutral Lewis base;

X is, independently, hydride radicals, hydrocarbyl radicals, substituted hydrocarbyl radicals, halocarbyl radicals, substituted halocarbyl radicals, and hydrocarbyl- and halocarbyl-substituted organometalloid radicals or X may optionally be covalently bonded to M and L' or all and any M, S, and S'; or, if p is 2, two X may be joined and bound to the metal atom to form a metallocyclic ring containing from about 3 to about 20 carbon atoms provided that X is not a substituted or unsubstituted Cp ring as previously defined; and $(JS'_{z-1-y})$ or $(JS'_{z-2})$ is a heteroatom ligand in which J is an element from Group 15 of the Periodic Table of Elements with a coordination number of 3 or an element from Group 16 with a coordination number of 2; S' is a radical group which is a hydrocarbyl, substituted hydrocarbyl, halocarbyl, substituted halocarbyl, hydrocarbyl-substituted organometalloid, or halocarbyl-substituted organometalloid; z is the coordination number of the element J;

y is 0 or 1, preferably y is 1 w is an integer from 0 to 1; and p is an integer from 1 to 2.

Examples of bridging groups A' include but are not limited to $R_2C$, $R_2Si$, $R_2Ge$, $R_2CR_2C$, $R_2SiR_2Si$, $R_2GeR_2Ge$, $R_2CR_2Si$, $R_2CR_2GeR_2CR_2C$, $R_2SiOR_2Si$ diradicals where R is independently selected from the group containing hydride, halogen radicals, and $C_{1-20}$ hydrocarbyl radicals. Preferably, A' has a bridge length of two atoms or less as in methylene, ethylene, diphenylsilyl, dimethylsilyl or methylphenylsilyl.

Examples of substituent groups S include but are not limited to $C_{1-20}$ hydrocarbyl radicals including $C_{1-20}$ linear and branched alkyl radicals such as methyl, ethyl, propyl, butyl, pentyl, hexyl, heptyl, octyl, nonyl, decyl, $C_{1-20}$ hydrocarbyl-substituted and unsubstituted cyclic aliphatic and polycyclic aliphatic radicals such as cyclopropyl, cyclobutyl, cyclopentyl, cyclohexyl, phenylcyclohexyl, methylcyclohexyl, cycloheptyl, cyclooctyl, cyclodecyl, cyclododecyl, isopropyldodecyl, adamantyl, norbornyl, tricyclo[5.2.1.0]decyl, $C_{1-20}$ hydrocarbyl-substituted and unsubstituted aryl radicals including phenyl, methylphenyl, trimethylphenyl, cyclohexylphenyl, napthyl, butylphenyl, butyldimethylphenyl; $C_{1-20}$ substituted hydrocarbyl radicals including benzyl, N,N-dimethylaminobenzyl, N,N-dimethylaminomethyl, methoxymethyl, diphenylphosphinomethyl, fluorophenyl, trifluoromethylphenyl, fluoromethyl, cyanoethyl; $C_{1-20}$ linear and branched halocarbyl radicals including trifluoromethyl, perfluoroethyl, perfluoropropyl, perfluorobutyl, perfluorophenyl, chlorodifluoromethyl, chlorotetrafluorophenyl, bromotetrafluorophenyl, iodotetrafluorophenyl; $C_{1-20}$ substituted-halocarbyl radicals such as methyltetrafluorophenyl, N,N-dimethyldifluoromethyl, methoxyperflouroethyl; $C_{1-20}$ hydrocarbyl-substituted organometalloid radicals including trimethylsilyl, trimethylgermyl, triphenylsilyl, triphenylgermyl; $C_{1-20}$ halocarbyl-substituted organometalloid radicals including tris(trifluoromethyl)silyl, tris(trifluoromethyl)germyl, tris(perfluorophenyl)silyl, tris(perfluorophenyl)germyl; $C_{1-20}$ hydrocarbyl-substituted boron radicals including dimethylboranyl, diphenylboranyl; $C_{1-20}$ hydrocarbyl-substituted pnictogen radicals including N,N-dimethylamino, diphenylamino, diphenylphosphino, dimethylphosphino; $C_{1-20}$ hydrocarbyl-substituted chalcogen radicals including methoxy, ethoxy, butoxy, phenoxy, methylthio, ethylthio, phenylthio, and halogen radicals including fluoro, chloro, bromo, and iodo.

Examples of neutral Lewis base ligands (L') include but are not limited to diethylether, dimethylether, N,N-dimethylanaline, trimethylamine, triphenylamine, riethylamine, triphenylphosphine, trimethylphosphine, thiophene, dimethylsulfide, enzyne, ethylene, propylene, butene, 1,4-hexadiene and acetylene.

X is independently a univalent anionic ligand including but not limited to hydride, $C_{1-20}$ hydrocarbyl radicals including $C_{1-20}$ linear and branched alkyl radicals such as methyl, ethyl, propyl, butyl, pentyl, hexyl, heptyl, octyl, nonyl, decyl, $C_{1-20}$ hydrocarbyl-substituted and unsubstituted cyclic aliphatic and polycyclic aliphatic radicals such as cyclopropyl, cyclobutyl, cyclopentyl, cyclohexyl, phenylcyclohexyl, methylcyclohexyl, cycloheptyl, cyclooctyl, cyclodecyl, cyclodocecyl, isopropyldodecyl, adamantyl, norbornyl, tricyclo[5.2.1.0]decyl, $C_{1-20}$ hydrocarbyl-substituted and unsubstituted aryl radicals including phenyl, methylphenyl, trimethylphenyl, cyclohexylphenyl, butylphenyl, butyldimethylphenyl; $C_{1-20}$ substituted hydrocarbyl radicals including benzyl, N,N-dimethylaminobenzyl, N,N-dimethylaminomethyl, methoxyhexyl, diphenylphosphinodecyl, fluorophenyl, trifluoromethylphenyl, fluoromethyl; $C_{1-20}$ hydrocarbyl-substituted organometalloid radicals including trimethylsilyl, trimethylgermyl, triphenylsilyl, triphenylgermyl; $C_{1-20}$ halocarbyl-substituted organometalloid radicals including tris(trifluoromethyl)silyl, tris(trifluoromethyl) germyl, tris(perfluorophenyl)silyl, tris(perfluorophenyl) germyl. Optionally if p is 2, two X's may form a metallocycle with the metal such as methylidene, ethylidene or propylidene. In all cases, X is not a Cp ring as defined by $(C_5H_{5-y-x}S_x)$.

Examples of S' include but are not limited to $C_{1-20}$ hydrocarbyl radicals including $C_{1-20}$ linear and branched alkyl radicals such as methyl, ethyl, propyl, butyl, pentyl, hexyl, heptyl, octyl, nonyl, decyl, $C_{1-20}$ hydrocarbyl-substituted and unsubstituted cyclic aliphatic and polycyclic aliphatic radicals such as cyclopropyl, cyclobutyl, cyclopentyl, cyclohexyl, phenylcyclohexyl, methylcyclohexyl, cycloheptyl, cyclooctyl, cyclodecyl, cyclododecyl, isopropyldodecyl, adamantyl, norbornyl, tricyclo[5.2.1.0]decyl, $C_{1-20}$ hydrocarbyl-substituted and unsubstituted aryl radicals including phenyl, methylphenyl, trimethylphenyl, cyclohexylphenyl, napthyl, butylphenyl, butyldimethylphenyl; $C_{1-20}$ substituted hydrocarbyl radicals including benzyl, N,N-dimethylaminobenzyl, N,N-dimethylaminomethyl, methoxymethyl, diphenylphosphinomethyl, fluorophenyl, trifluoromethylphenyl, fluoromethyl, cyanoethyl; $C_{1-20}$ linear and branched halocarbyl radicals including trifluormethyl, perfluoroethyl, perfluoropropyl, perfluorobutyl, perfluorophenyl, chlorodifluoromethyl, chlorotetrafluorophenyl, bromotetrafluorophenyl, iodotetrafluorophenyl; $C_{1-20}$ substituted-halocarbyl radicals such as methyltetrafluorophenyl, N,N-dimethyldifluoromethyl, methoxyperflouoroethyl; $C_{1-20}$ hydrocarbyl-substituted organometalloid radicals including trimethylsilyl, trimethylgermyl, triphenylsilyl, triphenylgermyl; $C_{1-20}$ halocarbyl-substituted organometalloid radicals including tris(trifluoromethyl)silyl, S tris(trifluoromethyl)germyl, tris (perfluorophenyl)silyl, tris(perfluorophenyl)germyl.

Table 1 depicts representative constituent moieties for the transition metal component.

Transition metal compound precursors providing tacticity control for the stereospecific polymerization of prochiral olefins, propylene, or higher alpha-olefins, exist when A' acts to restrict rotation of Cp ring and/or the Cp ring is of sufficient bulk to restrict rotation such that the appropriate symmetry conditions are satisfied.

In one embodiment preferably prochiral transition metal compounds for the production of isotactic polymers are those where A' is a bridging group and the substituents on Cp are chosen such that 1) the steric difference between Cp and the heteroatom is maximized and 2) the absence of a plane of symmetry through the metal center and the carbon atoms on the Cp and heteroatom which are bonded to A'. For the production of syndiotactic polymers the second condition requires the presence of a plane of symmetry through the metal center and the carbon atoms on the Cp and heteroatom which are bonded to A'.

In another embodiment the transition metal component are represented by the following general formula:

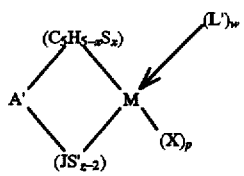

For the formula above the definitions are as presented above.

The anion should be sufficiently labile to be displaced by olefinic, diolefinic, and acetylenically unsaturated substrates or other neutral Lewis bases such as ethers, nitrites and the like. Two classes of compatible non-coordinating anions have been disclosed in EP-A-277 003 and EP-A-277 004: 1) anionic coordination complexes comprising a plurality of lipophilic radicals covalently coordinated to and shielding a central charge-bearing metal or metalloid core, and 2) anions comprising a plurality of boron atoms such as carboranes, metallacarboranes and boranes.

In one embodiment, the activator compounds comprising single anionic coordination complexes which are useful in the process of this invention are represented by the following general formula:

$$[(L'-H)]^{r+}[(M')^{m+}Q_1Q_2 \ldots Q_n]^{d-}$$

wherein:
H is a hydrogen atom;
[L'-H] is a Bronsted acid;
M' is a metal or metalloid;
$Q_1$ to $Q_n$ are, independently, hydride radicals, bridged or unbridged dialkylamido radicals, alkoxide and aryloxide radicals, substituted-hydrocarbyl radicals, halocarbyl and substituted-halocarbyl radicals and hydrocarbyl- and

TABLE 1

| A' | $C_5H_{5-y-x}S_x$ | (JS'$_z$) | X | M |
|---|---|---|---|---|
| dimethylsilyl | cyclopentadienyl | t-butylamido | hydride | zirconium |
| diethylsilyl | dimethylcyclopentadienyl | phenylamido | methyl | hafnium |
| di-n-propylsilyl | 2,3-dimethylcyclopentadienyl | p-n-butylphenylamido | ethyl | titanium |
| di-isopropylsilyl | 2,4-dimethylcyclopentadienyl | cyclohexylamido | phenyl | |
| di-n-butylsilyl | idenyl | perfluorophenylamido | n-propyl | |
| di-t-butylsilyl | 1,2-diethylcyclopentadienyl | n-butylamido | isopropyl | |
| di-n-hexylsilyl | ethylcyclopentadienyl | methylamido | n-butyl | L' |
| | | | | |
| methylphenylsilyl | n-butylcyclopentadienyl | ethylamido | amyl | ethylene |
| ethylmethylsilyl | 2-cyclohexy-3-methylcyclopentadienyl | n-propylamido | isoamyl | propylene |
| diphenylsilyl | 2-cyclohexy-4-methylcyclopentadienyl | isopropylamido | hexyl | 1-butene |
| di(p-t-butylphenethylsilyl) | n-octylcyclopentadienyl | benzylamido | isobutyl | 1,4-hexadiene |
| n-hexylmethylsilyl | beta-phenylpropylcyclopentadienyl | cyclododecylamido | heptyl | 1,3-butadiene |
| cyclopentamethylenesilyl | tetrahydroindenyl | s-butylamido | octyl | 1,3-hexadiene |
| cyclotetramethylenesilyl | propylcyclopentadienyl | t-butylphosphido | nonyl | acetylene |
| cyclotrimethylenesilyl | t-butylcyclopentadienyl | ethylphosphido | decyl | methylacetylene |
| dimethylgermanyl | benzylcyclopentadienyl | phenylphosphido | cetyl | ethylacentylene |
| diethylgermanyl | 2,4-diphenyl-3-methylcyclopentadienyl | cyclohexylphosphido | methylidene (two X) | benzyne |
| phenylamido | trimethylstannycyclopentadienyl | oxo | ethylidene (two X) | diethylether |
| t-butylamido | trimethylplumbylcyclopentadienyl | sulfido | propylidene (two X) | dimethylether |
| methylamido | triethylplumbylcyclopentadienyl | | | trimethylamine |
| t-butylphosphido | trifluromethylcyclopentadienyl | | | triphenylamine |
| ethylphosphido | trimethylsilcyclopentadienyl | | | triethyamine |
| phenylphosphido | pentamethycyclopentadienyl (when y = 0) | JS'$_{z-1-y}$(y = 0) | | triphenyl-phosphine |
| | | | | |
| methylene | fluorenyl | methoxide | | tetrahydrofuran |
| dimethylmethylene | octahydrofluorenyl | ethoxide | | thiophene |
| diethylmethylene | N,N-dimethylamidocyclopentadienyl | methylthio | | dimethylsulfide |
| ethylene | dimethylphosphidocyclopentadienyl | ethylthio | | |
| 1,1-dimethylethylene | methoxycyclopentadienyl | dimethylamido | | |
| 1,1-dipropylethylene | (N,N-dimethylamidomethyl)cyclopentadienyl | diphenylphosphido | | |
| 1,2-dipropylethylene | | | | |

The Ionic Activator Component of the Invention

Compounds useful as an activator component in the preparation of the ionic catalyst systems used in the process of this invention comprise a cation, which may be a Bronsted acid capable of donating a proton, and a compatible non-coordinating anion. The anion in the preferred embodiment is relatively large or bulky and capable of stabilizing the active catalyst species (the Group 4, 5 or 6 transition metal cation) which is made when the ionic pair is formed.

halocarbyl-substituted organometalloid radicals and any one, but not more than one, $Q_1$ to $Q_n$ may be a halide radical;

m is an integer representing the formal valence charge of M'; and n is the total number of Q ligands.

As indicated above, any metal or metalloid capable of forming an anionic complex which, preferably, is stable in water may be used or contained in the anion of the ionic activator. Suitable metals include but are not limited to aluminum, gold, platinum and the like. Suitable metalloids include, but are not limited to, boron, phosphorus, silicon and the like. Compounds containing anions which comprise coordination complexes containing a single metal or metalloid atom are well known and many, particularly such compounds containing a single boron tetra(o,p-dimethylphenyl)boron, tributylammonium tetra(m,m-dimethylphenyl)boron, tributylammoniumtetra(p-trifluoromethylphenyl)boron, tri(n-butyl)ammonium tetra(o-toly)boron: dialkyl ammonium salts such as di(i-propyl) ammonium tetrakis(pentafluorophenyl)borate.

Similar lists of suitable compounds containing other metals and metalloids which are useful as activator components may be made, but such lists are not deemed necessary to a complete disclosure. In this regard, it should be noted that the foregoing list is not intended to be exhaustive and that other useful boron compounds as well as useful compounds containing other metals or metalloids would be readily apparent to those skilled in the art from the foregoing general equations, see for example, U.S. Pat. Nos. 5,153,157 and 5,064,802, herein fully incorporated by reference.

The most preferred activator compounds comprising boron may be represented by the following general formula:

$$[L'-H]^+[B(C_6F_5)_3Q]^-$$

wherein:

F is fluorine, C is carbon and B is boron, L' and Q are as defined above. Illustrative but not limited, examples of most preferred activator compounds comprising boron which may be used in the preparation of the improved catalysts of this invention include N,N-dialkylanilinium salts (L'=N,N-dialkylaniline) where Q is a simple hydrocarbyl such as methyl, butyl, cyclohexyl, or substituted phenyl or where Q is a polymeric hydrocarbyl of indefinite chain length such as polystyrene, polyisoprene, or poly-paramethylstyrene. Polymeric Q substituents on the most preferred anion offer the advantage of providing a highly soluble ion-exchange activator component and final ionic catalyst. Soluble catalysts and/or precursors are often preferred over insoluble waxes, oils, phases, or solids because they can be diluted to a desired concentration and can be transferred easily using simple equipment in commercial processes.

Activator components based on anions which contain a plurality of boron atoms may be represented by the following general formulae:

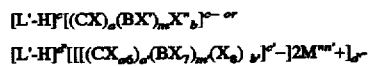

wherein:

[L'-H] is either H+ or a Bronsted acid derived from the protonation of a neutral Lewis base;

X, X', X", $X_6$, $X_7$ and $X_8$ are, independently, hydride radicals, halide radicals, hydrocarbyl radicals, subsituted-hydrocarbyl radicals, hydrocarbyl- or halocarbyl- substituted organometalloid radicals;

M" is a transition metal;

a and b are integers $\geq 0$; c is an integer $\geq 1$; a+b+c=an even-numbered integer from 2 to about 8; and m is an integer ranging from 5 to about 22;

a' and b' are the same or different integer 0; c' is an integer $\geq 2$; a'+b'+c'=an even-numbered integer from 4 to about 8; m' is an integer from 6 to about 12; n' is an integer such that 2c'−n'=d'; and d' is an integer $\geq 1$.

In another embodiment the anions comprising at least one or a plurality of boron atoms comprise:

(1) A trisubstituted ammonium salt of a borane or carborane anion satisfing the general formula:

wherein:

ax is either 0 or 1; cx is either 1 or 2; ax+cx=2; and bx is an integer ranging from about 10 to 12;

(2) A trisubstituted ammonium salt of a borane or carborane or a neutral borane or carborane compound satisfying the general formula:

wherein:

ay is an integer from 0 to 2; by is an integer from 0 to 3; cy is an integer from 0 to 3; ay+by+cy=4; and my is an integer from about 9 to about 18; or (3) A trisubstituted ammonium salt of a metallaborane or metallacarborane anion satisfying the following general formula:

wherein:

az is an integer from 0 to 2; bz is an integer from 0 to 2; cz is either 2 or 3; mz is an integer from about 9 to 11; az+bz+cz=4; and nz and dz are respectively, 2 and 2 or 3 and 1.

Illustrative, but non limiting, examples of ionic activators which can be used in preparing catalyst systems utilized in the process of this invention wherein the anion of the ionic activator contains a plurality of boron atoms are mono-, di-, trialkylammonium and phosphonium and dialkylarylammonium and -phosphonium atom in the anion portion, are commercially available. In a preferred embodiment salts containing anions comprising a coordination complex containing a single boron atom are preferred.

In another embodiment, the preferred ionic activator compounds comprising boron may be represented by the following general formula:

wherein:

B is boron in a valence state of 3;

$Ar_1$ and $Ar_2$ are the same or different substituted-aromatic hydrocarbon radicals containing from about 6 to about 20 carbon atoms and may be linked to each other through a stable bridging group; and $X_3$ and $X_4$ are, independently, hydride radicals, hydrocarbyl and substituted-hydrocarbyl radicals, hydrocarbyl- and halocarbyl-substituted organometalloid radicals, disubstituted pnictogen radicals, substituted chalcogen radicals and halide radicals, with the proviso that $X_3$ and $X_4$ will not be halide at the same time.

In general, $Ar_1$ and $Ar_2$ may, independently, be any substituted-aromatic hydrocarbyl radical. Suitable aromatic radicals include, but are not limited to, naphthyl and anthracenyl radicals. Suitable substituents on the substituted-aromatic hydrocarbyl radicals, include, but are not necessarily limited to, hydrocarbyl radicals, organometalloid radicals, alkoxy and aryloxy radicals, alkylamido radicals, fluorocarbyl and fluorohydrocarbyl radicals and the like such as those useful as $X_3$ and $X_4$. The substituent may be ortho, meta or para, relative to the carbon atoms bonded to the boron atom. When either or both $X_3$ and $X_4$ are a hydrocarbyl radicals, each may be the same or a different substituted-aromatic radical as are $Ar_1$ and $Ar_2$, or the same may be a straight or branched alkyl, alkenyl or alkynyl radical, a cyclic hydrocarbon radical or an alkyl-substituted cyclic hydrocarbon radical. $X_3$ and $X_4$ may also, independently be alkoxy or dialkylamido radicals wherein the alkyl portion of said alkoxy and dialkylamido radicals are hydrocarbyl radicals, organometalloid radicals and the like. As indicated above, $Ar_1$ and $Ar_2$ could be linked to either $X_3$ or $X_4$ and/or $X_3$ and $X_4$ may also be linked to each other through a suitable bridging group.

Examples of preferred boron compounds which may be used as the ionic activator component are trialkyl-substituted ammonium salts such as trimethylammonium tetra(p-toly) boron, trimethylammonium tetra(o-toly)boron, tributylammonium tetrakis(pentafluorophenyl)borate, tripropylammonium salts such as bis[tri(n-butyl)ammonium]dodecaborate, bis[tri(n-butyl)ammonium]decachlorodecaborate,tri(n-butyl)ammonium dodecachlorododecaborate, tri(n-butyl)ammonium 1-carbadecaborate, tri(n-butyl)ammonium 1-carbaudecaborate, tri(n-butyl)ammonium 1-carbadecaborate, tri(n-butyl)ammonium dibromo-1-carbadodecaborate; borane and carborane complexes and salts of borane and carborane anions such as decaborane (14), 7,8-dicarbaudecaborane (13), 2,7-dicarbaundecaborane (13), undecahydrideo-7,8-dimethyl-7,8-dicarbaundecaborane, tri(n-butyl)ammonium 6-carbadecaborate (12), tri(n-butyl)ammonium 7-carbaundecaborate, tri(n-butyl)ammonium 7,8-dicarbaundecaborate and metallaborane anions such as tri(n-butyl)ammonium bis(nonahydride-1,3-dicarbanonaborato) cobaltate (III), tri(n-butyl)ammonium bis(undecahydride-7,8-dicarbaundecaborato) ferrate (III), tri(n-butyl)ammonium bis(undecahydride-7,8-dicarbaundecaborato) cobaltate (III), tri(n-butyl)ammonium bis(undecahydride-7,8-dicarbaunaborato)nickelate (III), tri(n-butyl)ammonium bis(nonahydride-7,8-dimethyl-7,8-dicarbaundecaborato)ferrate (III), tri(n-butyl)ammonium bis (tribromooctahydride-7,8-dicarbaundecaborato)cobaltate (III), tri(n-butyl)ammonium bis (undecahydridodicarbasdodecaborato) cobaltate (III) and bis[tri(n-butyl)ammonium]bis(undecahydride-7-carbaundecaborato)cobaltate (III). A similar list of representative phosphonium compounds can be recited as, but for the sake of brevity, it is simply noted that the phosphonium and substituted-phosphonium salts corresponding to the listed ammonium and substituted-ammonium salts could be used as ionic activator compounds in the invention.

Ionic Catalysts of the Invention

In general, while most transition metal components identified above may be combined with most activator components identified above to produce an active olefin polymerization catalyst, it is desirable for continuity of the polymerization operations that either the metal cation initially formed form the transition metal component or a decomposition product thereof be a relatively stable catalyst. It is also desirable that the anion of the activator compound be stable to hydrolysis when an ammonium salt is used. Further, it is desirable that the acidity of the activator component be sufficient, relative to the transition metal component to facilitate the needed proton transfer. In general, Cp transition metal compounds which can be hydrolyzed by aqueous solutions are considered suitable as components to form the catalysts described herein.

With respect to the combination of the transition metal component with the ionic activator component to form a catalyst useful in the process of this invention, it is desirable that the two compounds forming the active ionic pair catalyst preferably should be selected to avoid transfer of a fragment of the anion, particularly an aryl group, to the metal cation, thereby forming a catalytically inactive species. Steric hindrance, resulting from substitutions on the Cp carbon atoms as well as substitutions on the aromatic carbon atoms of the anion can minimize fragmentation. Thus, in a preferred embodiment, transition metal components comprising perhydrocarbyl-substituted Cp radicals are preferred over unsubstituted Cp radicals because substituted Cp radicals can be used with a broader range of ionic activators. As the amount and size of the substitutions on the Cp radicals are reduced in one embodiment, more effective catalysts are obtained with ionic activator compounds containing anions which are more resistant to degradation, such as those with substituents at the ortho positions of phenyl rings. Another means of rendering the anion more resistant to degradation is afforded in one embodiment by fluorine substitution, especially perfluorosubstitution, in the anion. Fluoro-substituted stabilizing anions may be used with broader range of metal compounds. Activators in which the anions comprise pentafluorophenyl groups are preferred for preparing ion-pair transition metal catalysts of this invention. It is preferred that the mole ratio of transition metal component to activator component be about 1:1 or greater.

In one embodiment, the catalysts used in this invention can be represented by the following general formulae:

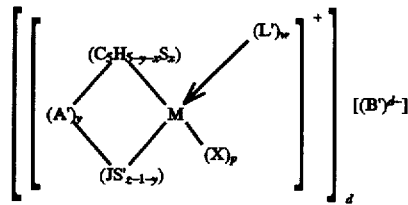

wherein:

A' is a bridging group containing a Group 14 element;

$(C_5H_{5-y-x}S_x)$ is a Cp ring substituted with from zero to five S radicals, each substituent group S being, independently, a radical group which is a hydrocarbyl, substituted-hydrocarbyl, halocarbyl, substituted-halocarbyl, hydrocarbyl-substituted organometalloid, halocarbyl-substituted organometalloid, hydrocarbyl-substituted boron, hydrocarbyl-substituted pnictogen, hydrocarbyl-substituted chalcogen or halogen or two adjacent S groups are joined forming a $C_4$ to $C_{20}$ ring to give a saturated or unsaturated polycyclic Cp ligand;

x is from 0 to 5 denoting the degree of substitution;

M is a Group 4 transition metal;

L' is a neutral Lewis base;

X is a hydride radical, hydrocarbyl radical, substituted-hydrocarbyl radical, hydrocarbyl-substituted organometalloid radical or halocarbyl-substituted organometalloid radical which radical may optionally be covalently bonded to both or either M and L' or all and any M, S, and S' and X is not a Cp ring as defined is above;

$(JS'_{z-1-y})$ is a heteroatom ligand in which J is an element from Group 15 of the Periodic Table of Elements with a coordination number of 3 or an element from Group 16 with a coordination number of 2; S' is a radical group which is a hydrocarbyl, substituted hydrocarbyl, halocarbyl, substituted halocarbyl, hydrocarbyl-substituted organometalloid, or halocarbyl-substituted organometalloid; and z is the coordination number of the element J;

y is 0 or 1, preferably y is 1 w is an integer from 0 to 1;

B' is a chemically stable, non-nucleophilic anionic complex having a molecular diameter about or greater than 4 angstroms; and d is an integer representing the charge of B'.

In another embodiment, the Group 4 transition metal complex is in a +3 oxidation state activated by an ionic activator to form an active catalyst.

In one embodiment, the cation portion of the ionic activator may comprise Bronsted acids such as protons, or protonated Lewis bases, or may comprise reducible Lewis acids such as ferricinium, tropylium, triphenylcarbenium or silver cations.

In general, suitable anions of the ionic activator may be any stable and bulky anionic complex having one or more of the following typical molecular attributes: 1) the anion should have a molecular diameter greater than about 4 angstroms; 2) the anion should form stable ammonium salts; 3) the negative charge on the anion should be delocalized over the framework of the anion or be localized within the core of the anion; 4) the anion should be a relatively poor nucleophile; and 5) the anion should not be a powerful reducing or oxidizing agent. In one embodiment, the anions meeting these criteria are for example, polynuclear boranes, carboranes, metallacarboranes, polyoxoanions and anionic coordination complexes are all of which described in the literature.

Upon combination of the transition metal component and the component ionic activator component, the cation of the ionic activator reacts with one of the ligands of the transition metal component, generating an anion pair comprising a metal cation and anion.

Supporting the Ionic Catalyst of the invention

For purposes of this patent specification the term "carrier" or "support" can be any porous support such as talc, inorganic oxides, and resinous support materials such as polyolefin or polymeric compounds.

Suitable inorganic oxide materials which are desirably employed as carriers in accordance with this invention include Group 2, 3, 4, 13, or 14 metal oxides. In a preferred embodiment, the catalyst support materials include silica, alumina, and silica-alumina, and mixtures thereof. Other inorganic oxides that may be employed either alone or in combination with the silica, alumina or silica-alumina are magnesia, titania and zirconia. Other suitable support materials, however, can be employed, for example, finely divided polyolefins such as finely divided polyethylene.

The specific particle size of the support or inorganic oxide, surface area, pore volume, and number of hydroxyl groups are not critical to its utility in the practice of this invention. However, such characteristics determine the amount of support to be employed in preparing the catalyst compositions, as well as affecting the properties of polymers formed. The characteristics of the carrier or support must therefore be taken into consideration in choosing the same for use in the particular invention. In one embodiment the carrier is surface modified with surface modifying agents as described in U.S. Pat. No. 5,124,418 incorporated herein by reference.

Producing the supported ionic catalyst on, for example, silica, was surprising. It would have been expected that the reaction of the ionic catalyst with a Lewis base, as present on the oxide surface, would result in catalyst deactivation.

The metal oxides generally contain surface hydroxyl groups which typically react with and deactivate the ionic transition metal catalyst. Therefore, to achieve a catalytically active system it is preferable that when an inorganic oxide support is used it should be essentially free of adsorbed hydroxyl groups on its surface. For the purposes of this patent specification "essentially free of" is defined as less than 50 mole percent, based on the moles of the catalyst of surface adsorbed Lewis base groups, preferably less than 25% and most preferably less than 10%. Suitable Lewis bases include but are not limited to neutral bases such as ethers, nitriles and the like.

In one embodiment when a support is employed that contains surface hydroxyl groups, a drying or dehydration treatment should be employed. Timing for the dehydration of the support is not critical; i.e., dehydration may occur immediately before use of the support or days before provided once the support is dehydrated, it is protected from moisture and impurities. Thermal treatment to dehydrate the support may be carried out in vacuum or while purging with a dry inert gas such as nitrogen at a temperature of 100° C. to 1000° C., and preferably, above 300° C. to 900° C., or more preferably 500° C. to 850° C. Pressure considerations are not critical. The duration of the thermal treatment can be from about 1 to 24 hours or more.

In another embodiment, chemical dehydration or chemical treatment to dehydrate the support may be accomplished by slurring the inorganic particulate material, such as, for example, silica in an inert low boiling hydrocarbon, such as, for example, hexane. During the chemical dehydration reaction, the support, preferably silica, should be maintained in a moisture and oxygen-free atmosphere. To the silica slurry is then added a low boiling inert hydrocarbon solution of the chemical dehydrating agent. Useful chemical agents are for example, chlorosilanes, such as trimethylchlorosilane and alkyl metal compounds such as dibutylmagnesium, diethylzinc, trimethylaluminum, triethylaluminum, trimethylaluminum and triethylaluminum being particularly preferred. The ratio of millimoles of metal alkyl per gram of support may be between 0.1 to 100, a ratio of 1 to 10 being preferred. The chemical dehydration may be carried out at temperatures of $-100°$ C. to 300° C. (preferably 0° C. to 100° C.) and contact times can range from 1 minute to 48 hours. The treated silica is filtered off and washed with a light aliphatic hydrocarbon (pentanes or hexanes) before drying in vacuo or in a dry stream of inert gas. Since even small amounts of alkyl metal can have an adverse effect on catalyst reactivity to comonomers, the support is washed several times with an inert hydrocarbon solvent to remove both excess dehydration agent and its dehydration reaction products.

It is not beyond the scope of this invention that monocyclopentadienyl transition metal compounds of the invention and/or other known transition metal metallocenes can be used to treat the carrier, or used in excess as a scavenger in the catalyst system of the invention.

The organometallic compounds are from those compounds of Group 1, 2, 3 and 4 organometallic alkyls, alkoxides, and halides. The preferred organometallic compounds are lithium alkyls, magnesium alkyls, magnesium alkyl halides, aluminum alkyls, silicon alkyls, silicon alkoxides, silicon aryloxides and silicon alkyl halides. The more preferred organometallic compounds are aluminum alkyls and magnesium alkyls. The most preferred organometallic compounds are aluminum alkyls, for example, triethylaluminum (TEAL), trimethylaluminum (TMAL), triisobutylaluminum (TIBAL) and tri-n-hexylaluminum (TNHAL) and the like.

In the preferred embodiment the organometallic compound is an oxy containing organometallic compound. In a more preferred embodiment the organometallic compound can be represented by the following formula:

which is a cyclic compound and

which is a linear compound and mixtures thereof including multi-dimensional structures. In the general formula R is a $C_1$ to $C_7$ alkyl group such as for example methyl, ethyl, propyl, butyl, pentyl, hexyl, octyl, nonyl and n is an integer from about 1 to 20. The most preferred oxy containing organometallic compounds are alumoxanes, for example methyl alumoxane and/or ethylalumoxane. It is known in the art to make alumoxanes, see for example U.S. Pat. Nos. 4,530,914 and 4,952,716 incorporated herein by reference.

The supported ionic transition metal catalyst suitable for use in this invention may be prepared by combining the transition metal component, the ionic activator component and the carrier in suitable solvents or diluents in one or more steps or in any combination thereof There are various ways to form the supported ionic catalyst of the invention. Some of which include:

1) The transition metal component can be contacted with the carrier followed by the addition of the ionic activator and a supported organometallic compound. 2) The carrier could be contacted with the ionic activator followed by the addition of the transition metal component and a supported organometallic compound. 3) The ionic activator may be contacted with the transition metal component and then contacting with a carrier contacted with an organometallic compound. 4) The transition metal component can be contacted with a carrier and an ionic activator and separately, an organometallic compound could be contacted with another carrier. 5) The ionic catalyst can be formed first and then contacted with a carrier and a supported organometallic compound. 6) The transition metal component and ionic activator can be contacted with a carrier then contacted with a carrier and an organometallic compound. 7) The carriers above can be treated chemically, physically with heat, or its surface modified before contacting it with either the transition metal component or the ionic activator or ionic catalyst. 8) The carrier can be contacted with the transition metal component then the ionic activator to form a solid catalyst that is sandwiched between an organometallic treated carrier in a preferred embodiment. 9) The carrier can be pretreated with an organometallic compound followed by the addition of the transition metal component and the activator in any order and a separate carrier contacted with another or the same organometallic compound.

Suitable solvents and/or diluents include, but are not necessarily limited to, straight and branched-chain hydrocarbons such as isobutane, butane, pentane, hexane, heptane, octane; cyclic and alicyclic hydrocarbons such as cyclohexane, cycloheptane, methylcyclohexane, methylcycloheptane; and aromatic and alkyl-substituted aromatic compounds such as benzene, toluene, xylene.

It is preferred that the catalyst components be handled in an inert, moisture-free, oxygen-free environment such as argon, nitrogen or helium because of the sensitivity of the catalyst components to moisture and oxygen.

Regardless of the method, the active supported catalyst can be recovered by removal of the solvent to obtain a free-flowing solid or alternatively, the active supported catalyst can be maintained in a slurry state for direct use.

The catalyst system of this invention can be made in various ways. In one embodiment, a monocyclopentadienyl ligand transition metal compound, such as a metallocene as described above and an ionic activator, is contacted optionally with a first carrier to form a first component, and independently, an organometallic compound, such as an alumoxane, is contacted with a second carrier to form a second component. The first and second components can be used in slurry form or dried or any combination thereof.

The first component of the catalyst system of the invention comprises a majority of a carrier and a monocyclopentadienyl bulky ligand transition metal compound and anionic activator. The transition metal compound is generally in the range of 0.01 to about 50 weight percent of the total weight of the first component, preferably, 0.1 to about 25 weight percent, more preferably 0.3 to 10 weight percent and most preferably 0.5 to about 5 weight percent.

The second component of the catalyst system of the invention comprises a majority of a carrier and a organometallic compound. The organometallic compound is generally in the range of 1 to about 75 weight percent of the total weight of the second component, preferably, 1 to about 50 weight percent, more preferably 1 to about 25 weight percent, and most preferably 1 to about 15 weight percent.

The carriers of the invention can be the same or different or mixtures thereof In the preferred embodiment the carrier in both components is the same type, and is preferably silica.

In another embodiment, at least one of the metallocenes of this invention and another metallocene for example of U.S. Pat. No. 4,808,561, incorporated herein by reference can be used to form the first component or more than one first component is used and a similar or different organometallic compound can be used on one second component or more than one second component containing one or more organometallics can be used in the invention, or any combination thereof. In still yet another embodiment, the first and second components are further supported together on another carrier, other than the carriers used to support the first and second components, or separately supported on different carriers or even different types of carriers.

In one embodiment of the invention the first component can contain a quantity of an ionic activator such that the mole ratio of the transition metal of the bulky ligand transition metal compound to the metal of the activator is in the range of less than 0.2:1 to 1000:1, preferably, less than 0.5:1 to 500:1, more preferably 0.7:1 to 300:1 and most preferably less than 1:1 to 200:1.

In another embodiment, the mole percent of the metal of the organometallic compound of the second component to the transition metal of the bulky ligand transition metal compound of the first component is in the range of 1000:1 to 50:1, preferably less than 500:1, more preferably 200:1, even more preferably 150:1 and most preferably 50:1 to 100:1.

In a preferred embodiment, the weight ratio of the first component to the second component is in the range of 20:1 to about 1:20, preferably 10:1 to 10:1, more preferably 5:1 to 1:5 and most preferably 2:1 to 1:2.

In the preparation of the supported ionic catalyst, the component should be combined to provide a catalyst concentration (transition metal and ionic activator) on the carrier of from about 0.01 wt % to 20 wt %, preferably about 1 wt % to about 5 wt %, more preferably about 1 wt % to about 10 wt % and most preferably about 1 wt % to about 5 wt %, based upon the total weight of the support.

Polymer and Products of the Invention

The catalysts useful in the process of this invention, in the absence of a chain transfer agent, can lead to the production of extremely high molecular weight polymers, low melt index, and copolymers having relatively narrow molecular weight distributions. In this regard, it should be noted that homopolymers and copolymers in one embodiment have molecular weights as high as from $2\times10^5$ up to $2\times10^6$ or higher and molecular weight distributions within the range of 1.5 to 3.5, preferably 1.5 to 3.2 and most preferably 1.5 to about 3 can be produced. In addition, if lower or moderate molecular weights are desired, molecular weight can be controlled with the use of a chain transfer agent such as hydrogen.

It is not beyond the scope of this invention that the polymer described in WO 93/08221 published Apr. 29, 1993 can be made with the catalyst system of this invention. These polymers typically have high melt flow ratios and a low molecular weight distribution.

Combinations of two or more supported ionic transition metal catalyst of the invention can be employed in order to obtain broader MWD such as up to 15 or greater. Alternatively, two or more separately supported ionic catalysts useful in this invention can be used to obtain broad MWD polymers and copolymers.

The MI of the polymers produced by the process of the invention are generally in the range 0.1 dg/min to about 1000 dg/min, preferably 0.2 dg/min to about 300 dg/min, more preferably about 0.3 to about 200 dg/min and most preferably 0.5 dg/min to about 100 dg/min.

In some instances where it is necessary to improve processability and manipulate final end product characteristics the polymers produced by this present invention can be blended or coextruded into single or multilayer films or the like with various other polymers well known in the art, for instance, LLDPE, LDPE, HDPE, PP, PB, EVA and the like. The polymers produced by the process of the invention are useful in such forming operations include, film, sheet, and fiber extrusion and co-extrusion as well as blow molding, injection molding and roto molding. Films include blown or cast films in mono-layer or multilayer constructions formed by coextrusion or by lamination. Such films are useful as shrink film, cling film, stretch film, sealing films, oriented films, snack packaging, heavy duty bags, grocery sacks, baked and frozen food packaging, medical packaging, industrial liners, membranes, etc. in food-contact and non-food contact applications. Fiber forming operations include melt spinning, solution spinning and melt blown fiber operations. Such fibers may be used in woven or non-woven form to make filters, diaper fabrics, medical garments, geotextiles, etc. General extruded articles include medical tubing, wire and cable coatings, geomembranes, and pond liners. Molded articles include single and multi-layered constructions in the form of bottles, tanks, large hollow articles, rigid food containers and toys, etc.

EXAMPLES

In order to provide a better understanding of the present invention including representative advantages and limitations thereof, the following examples are offered.

Density is measured in accordance with ASTM-D-1238. The ratio of Mw/Mn can be measured directly by gel permeation chromatography techniques.

For the purposes of this patent specification the MWD of a polymer is determined with a Waters Gel Permeation Chromatograph equipped with Ultrastyrogel columns and a refractive index detector. In this development, the operating temperatures of the instrument was set at 145° C., the eluting solvent was trichlorobenzene, and the calibration standards included sixteen polystyrenes of precisely known molecular weight, ranging from a molecular weight of 500 to a molecular weight of 5.2 million, and a polyethylene standard, NBS 1475.

COMPARATIVE EXAMPLE 1

Preparation of Silica-Supported $\{Me_2Si(C_5Me_4)(NC_{12}H_{23})TiMe_2+[DMAH][B(pfp)_4]\}$ 0.2 g Dimethylsilylbridged(tetramethylcyclopentadienyl) (dodecylamido) titanium dimethyl $[Me_2Si(C_5Me_4)(NC_{12}H_{23})TiMe_2]$ was dissolved in 30 cm$^3$ toluene and added to a slurry of 3.1 g sample of Davison 948 silica (that had been dehydrated to 850° C.) in 60 cm$^3$ hexanes at 22° C. After stirring for 1 h, 0.333 g N,N-dimethylanilinium tetrakis(pentafluorophenyl) boron, dissolved in 120 cm$^3$ toluene, was added and stirring continued at 22° C. for another 18 h. Then the solvent was removed under vacuum to give a free-flowing supported catalyst.

Polymerization of Olefins

A sample (1 g) of the supported catalyst from above was admitted into a semi-batch gas-phase reactor with a N$_2$ pressure. A feed of 1-butene in ethylene was then admitted into the reactor at 90° C. The pressure in the reactor was held constant by continuously feeding 5 mol-% 1-butene in ethylene to compensate for any pressure change due to polymerization. After 1 h, the polymer formed was separated from the seed bed material and analyzed for resin molecular properties and the results are shown in Table 1.

COMPARATIVE EXAMPLE 2

Preparation of Silica-Supported $\{Me_2Si(C_5Me_4)(NC_{12}H_{23})TiMe_2+[DMAH][B(pfp)_4]\}$ 0.2 g $Me_2Si(C_5Me_4)(NC_{12}H_{23})TiMe_2$ mixed with 0.333 g N,N-dimethylanilinium tetrakis(pentafluorophenyl) boron was dissolved in 120 cm$^3$ toluene and stirred for 0.5 h and then added to a slurry of 3.1 g sample of Davison is 948 silica (that had been dehydrated to 850° C.) in 40 cm$^3$ toluene at 22° C. After 14 h, the solvent was removed under vacuum to give a free-flowing supported catalyst.

Polymerization of Olefins

A sample (1 g) of the supported catalyst from above was admitted into a semi-batch gas-phase reactor with a N$_2$ pressure. A feed of 1-butene in ethylene was then admitted into the reactor at 90° C. The pressure in the reactor was held constant by continuously feeding 5 mol-% 1-butene in ethylene to compensate for any pressure change due to polymerization. After 1 h, the polymer formed was separated from the seed bed material and analyzed for resin molecular properties and the results are shown in Table 1.

COMPARATIVE EXAMPLE 3

Preparation of Silica-Supported $Me_2Si(C_5Me_4)(NC_{12}H_{23})TiCl_2$ 0.313 g $Me_2Si(C_5Me_4)(NC_{12}H_{23})TiCl_2$ dissolved in 50 cm$^3$ toluene and added to a slurry of 5 g sample of Davison 948 silica (that had been dehydrated to 850° C.) in 60 cm$^3$ hexanes at 22° C. After 2 h, the solvent was removed under vacuum to give a free-flowing supported metallocene.

Preparation of TMA-Treated Silica Support 400 g Davison 948 silica having Loss-On-Ignition (LOI) value of 11.14 wt-% was added slowly to 3380 cm$^3$ of 10 wt-% trimethyl aluminum solution in isopentane contained in a 5-liter flask at −75° C. The silica was added at a rate of about 1.1 g/min. After all the silica had been added the slurry was allowed to arm up to 22° C. and this was maintained for 1 h. Then the support material was dried to free-flowing powder.

Polymerization of Olefins 2 g sample of the TMA-treated silica solid described above was combined with 1 g sample of the silica-supported metallocene in a vial and shaken vigorously. A sample (1 g) of the solid mixture was then admitted into a semi-batch gas-phase reactor with a $N_2$ pressure. A feed of 1-butene in ethylene was then admitted into the reactor at 90° C. The pressure in the reactor was held constant by continuously feeding 5 mol-% 1-butene in ethylene to compensate for any pressure change due to polymerization. After 1 h, the polymer formed was separated from the seed bed material and analyzed for resin molecular properties and the results are shown in Table 1.

EXAMPLE A OF THE INVENTION

A sample (1 g) of the silica-supported {$Me_2Si(C_5Me_4)$ $(NC_{12}H_{23})TiMe_2$+[DMAH][B(pfP)$_4$]} described in Example 1 was combined with a sample (1 g) of the TMA-treated silica solid described in Example 2. This mixture was shaken vigorously in a vial and 1.8 g of the resultant solid mixture was used for the polymerization of 5 mol-% 1-butene in ethylene as described in Example 1.

EXAMPLE B OF THE INVENTION

Preparation of Silica-Supported {$Me_2Si(C_5Me_4)(NC_{12}H_{23})$ $TiMe_2$+[DMAH][B(pfp)$_4$]+Methylalumoxane}

0.2 g $Me_2Si(C_5Me_4)(NC_{12}H_{23})TiMe_2$ mixed with 0.333 g N,N-dimethylanilinum tetrakis(pentafluorophenyl) boron was dissolved in 100 cm³ toluene and stirred for 1 h at 25° C.

To a suspension of 2.4 g sample of Davison 948 silica (that had been dehydrated to 600° C.) in 60 cm³ hexanes, at 22° C., was added 8.5 cm³ solution of 10 wt-% methylalumoxane in toluene; this was stirred for 1 h.

The solution of the $Me_2Si(C_5Me_4)(NC_{12}H_{23})TiMe_2$ and the [DMAH][B(pfp)$_4$] was then added to the suspension of the MAO-treated silica at 25° C. and stirred for 12 h. The solvent was removed under vacuum to give a free-flowing catalyst powder.

0.2 g sample of the TMA-treated silica described in example 3 above was added into a catalyst holding tube as a bottom layer of treated silica, to this was added 1 g of the free-flowing catalyst powder described above, then a second layer of 0.2 g of the TMA-treated silica was added as a top layer such that the layer of the free-flowing catalyst powder was sandwiched between two layers of the TMA-treated silica. This catalyst holding tube was, meanwhile, clamped in place such that no shaking took place. This catalyst setup was then admitted into a semi-batch gas-phase reactor with a $N_2$ pressure. A feed of 1-butene in ethylene was then admitted into the reactor at 90° C. The pressure in the reactor was held constant by continuously feeding 5 mol-% 1-butene in ethylene to compensate for any pressure change due to polymerization. After 1 h, the polymer formed was separated from the seed bed material and analyzed for resin molecular properties and the results are shown in Table 1.

TABLE 1

| Example | $C_2=/C_4=$ partial pressure (psi) | Polymer Yield (g) | Resin Density (g/cc) | $M_w$ | $M_w/M_n$ |
|---|---|---|---|---|---|
| C1 | 184 | 0.9 | — | 110410 | 3.77 |
| C2 | 175 | 3.8 | — | 167770 | 3.85 |
| C3 | 179 | 13 | 0.9670 | 425470 | 4.64 |

TABLE 1-continued

| Example | $C_2=/C_4=$ partial pressure (psi) | Polymer Yield (g) | Resin Density (g/cc) | $M_w$ | $M_w/M_n$ |
|---|---|---|---|---|---|
| A | 221 | 44 | 0.9303 | 409860 | 6.06 |
| B | 172 | 147 | 0.9017 | 530970a | 3.03 | a)As a result of the poor solubility of the polymer in the solvent used for the GPC analysis, this value is believed to be only a fraction of the polymer Mw.

While the present invention has been described and illustrated by reference to particular embodiment thereof, it will be appreciated by those of ordinary skill in the art that the invention lends itself to variations not necessarily illustrated herein. In addition the catalyst used in this invention can be combined with one or more other metallocene catalyst well known in the art and/or with traditional Zielger-Natta catalysts. Further, the supported ionic catalyst utilized in this invention can be used with other activators or cocatalysts such as alumoxane. Also, two or more reactors in series may be used with any combination of catalysts with the ionic catalyst system used in this invention. For these reason, then, reference should be made solely to the appended claims for the purposes of determining the true scope of the present invention.

We claim:

1. A catalyst system comprising:
   (a) an ionic catalyst formed by combining
      (i) a monocyclopentadienyl ligand transition metal compound; and
      (ii) an ionic activator; and
   (b) an alkyl metal compound supported on a carrier.

2. The catalyst system of claim 1 wherein the transition metal is a Group 4, 5, or 6 transition metal or a mixture thereof.

3. The catalyst system of claim 1 wherein the transition metal is titanium, zirconium or hafnium or mixtures thereof.

4. The catalyst system of claim 1 wherein the monocyclopentadienyl ligand transition metal compound is represented by the general formula:

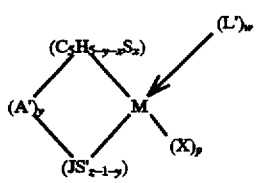

wherein:

A' is a bridging group;

$(C_5H_{5-y-x}S_x)$ is a Cp ring substituted with from zero to five S radicals, each substituent group S being, independently, a radical group which is a hydrocarbyl, substituted-hydrocarbyl, halocarbyl, substituted-halocarbyl, hydrocarbyl-substituted organometalloid, halocarbyl-substituted organometalloid, hydrocarbyl-substituted boron, hydrocarbyl-substituted pnictogen, hydrocarbyl-substituted chalcogen or halogen or two adjacent S groups are joined forming a $C_4$ to $C_{20}$ ring to give a saturated or unsaturated polycyclic Cp ligand;

x is from 0 to 5 denoting the degree of substitution;

M is Group 4 transition metal;

L' is a neutral Lewis base;

X is a hydride radical, hydrocarbyl radical, substituted-hydrocarbyl radical, hydrocarbyl-substituted organometalloid radical or halocarbyl-substituted organometalloid radical, which radical may optionally be covalently bonded to both or either M and L';

(JS'$_{z-1-y}$) is a heteroatom ligand in which J is an element from Group 15 of the Periodic Table of Elements with a coordination number of 3 or an element from Group 16 with a coordination number of 2; S' is a radical group which is a hydrocarbyl, substituted hydrocarbyl, halocarbyl, substituted halocarbyl, hydrocarbyl-substituted organometalloid, or halocarbyl-substituted organometalloid; z is the coordination number of the element J;

y is 0 or 1;

w is an integer from 0 to 1; and p is an integer from 1 to 2.

5. The catalyst system of claim 1 wherein said ionic activator is a boron-ammonium salt compound.

6. A new catalyst system comprising:

(a) at least one ionic metallocene catalyst comprising a Group 4, 5, or 6 monocyclopentadienyl liquid transition metal cation and a chemically stable, non-nucleophilic anionic complex; and (b) at least one second component comprising a carrier and an alkyl metal compound.

7. The catalyst system of claim 6 wherein said monocyclopentadienyl ligand transition metal cation comprises a Group 4 transition metal.

8. The catalyst system of claim 7 wherein said chemically stable, non-nucleophilic anionic complex comprises boron or aluminum.

9. The catalyst system of claim 6 wherein said chemically stable, non-nucleophilic anionic complex comprises boron or aluminum.

10. The catalyst system of claim 6 wherein said ionic metallocene catalyst is represented by the formula:

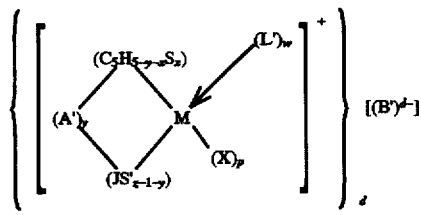

wherein:

A' is a bridging group;

(C$_5$H$_{5-y-x}$S$_x$) is a Cp ring substituted with from zero to five S radicals, each substituent group S being, independently, a radical group which is a hydrocarbyl, substituted-hydrocarbyl, halocarbyl, substituted-halocarbyl, hydrocarbyl-substituted organometalloid, halocarbyl-substituted organometalloid, hydrocarbyl-substituted boron, hydrocarbyl-substituted pnictogen, hydrocarbyl-substituted chalcogen or halogen or two adjacent S groups are joined forming a C$_4$ to C$_{20}$ ring to give a saturated or unsaturated polycyclic Cp ligand;

x is from 0 to 5 denoting the degree of substitution;

M is Group 4 transition metal;

L' is a neutral Lewis base;

X is a hydride radical, hydrocarbyl radical, substituted-hydrocarbyl radical, hydrocarbyl-substituted organometalloid radical or halocarbyl-substituted organometalloid radical, which radical may optionally be covalently bonded to both or either M and L';

(JS'$_{z-1-y}$) is a heteroatom ligand in which J is an element from Group 15 of the Periodic Table of Elements with a coordination number of 3 or an element from Group 16 with a coordination number of 2; S' is a radical group which is a hydrocarbyl, substituted hydrocarbyl, halocarbyl, substituted halocarbyl, hydrocarbyl-substituted organometalloid, or halocarbyl-substituted organometalloid; z is the coordination number of the element J;

y is 0 or 1;

w is an integer from 0 to 1;

p is an integer from 1 to 2; and

B' is a chemically stable, non-nucleophilic anionic complex having a molecular diameter about or greater than 4 angstroms; and d is an integer representing the charge of B'.

11. The catalyst system of claim 10 wherein (C$_5$H$_{5-y-x}$S$_x$) is tetramethylcyclopentadienyl, A' is dimethylsilyl, y is 1, (JS'$_{z-1-y}$) is t-butylamido, M is zirconium, X is methyl, L' is N,N-dimethylaniline, and B' is tetrakis(pentafluorophenyl) borate.

12. The catalyst system of claim 10 wherein (JS'$_{z-1-y}$) is C$_{12}$H$_{23}$ and M is titanium.

13. The catalyst system of claim 10 wherein B' is represented by the general formula:

$$(M')^{m+}Q_1Q_2 \ldots Q_n$$

wherein:

M' is a metal or metalloid;

Q$_1$ and Q$_n$ are, independently, hydride radicals, bridged or unbridged dialkylamido radicals, alkoxide and aryloxide radicals, substituted-hydrocarbyl radicals, halocarbyl and substituted-halocarbyl radicals and hydrocarbyl- and halocarbyl-substituted organometalloid radicals and any one, but not more than one, Q$_1$ and Q$_n$ may be a halide radical;

m is an integer representing the formal valence charge of M'; and n is the total number of Q ligands.

14. The catalyst system of claim 13 wherein M' is boron or aluminum.

15. A method for preparing a supported polymerization catalyst comprising the steps of:

(a) contacting at least one monocyclopentadienyl transition metal compound with at least one ionic activator to form an ionic catalyst; and (b) contacting said ionic catalyst with a supported alkyl metal compound.

16. The method of claim 15 wherein said at least one monocyclopentadienyl transition metal compound is represented by said general formula of claim 6.

17. The catalyst system of claim 1 wherein the carrier is an inorganic oxide or polymeric compound or mixtures thereof.

* * * * *